Figure 6:
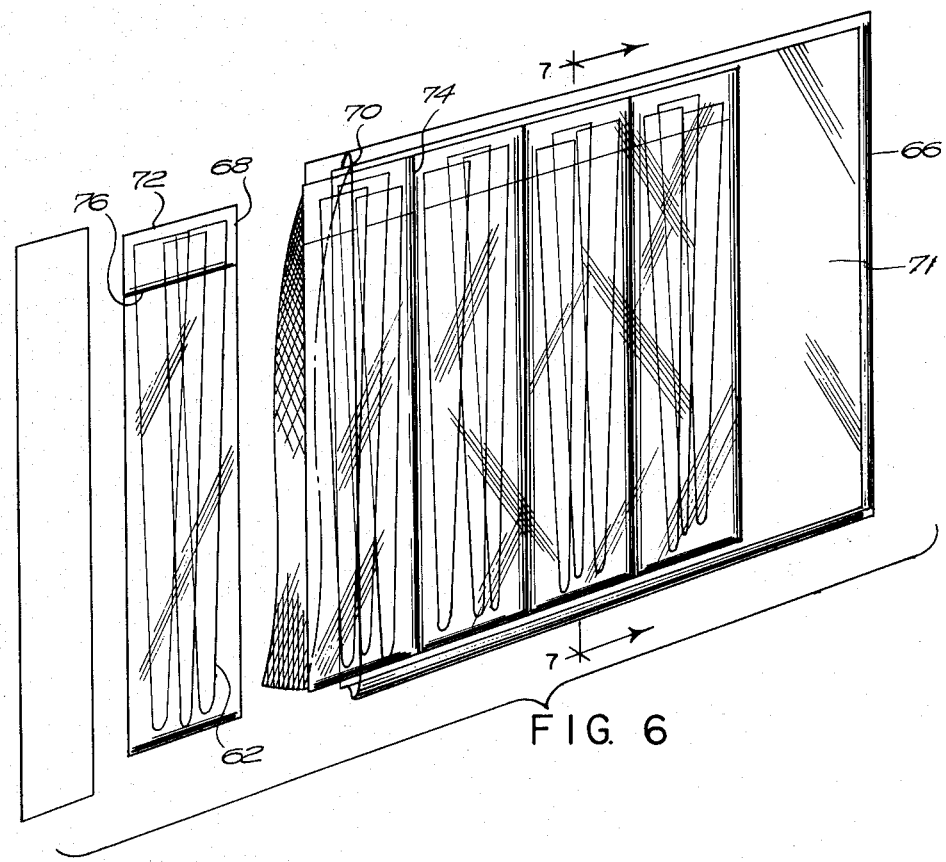

Dec. 7, 1965     C. H. BIBER     3,221,555
CLINICAL THERMOMETER
Filed Nov. 1, 1961     2 Sheets-Sheet 1
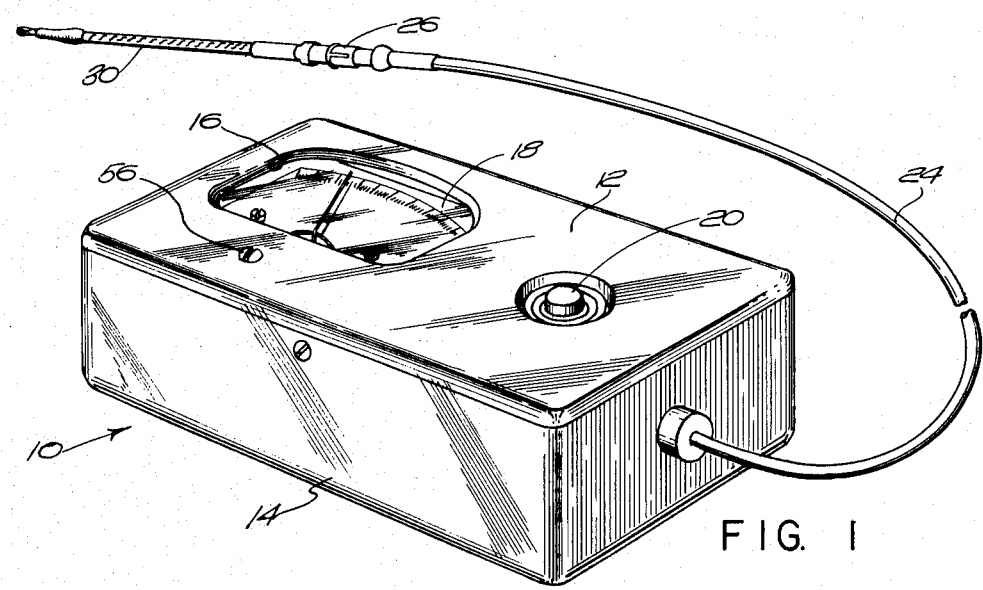
FIG. 1
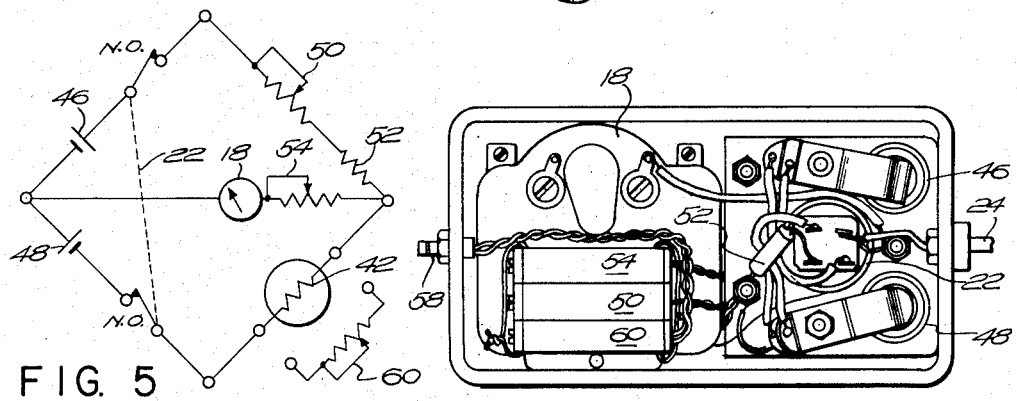
FIG. 5     FIG. 2
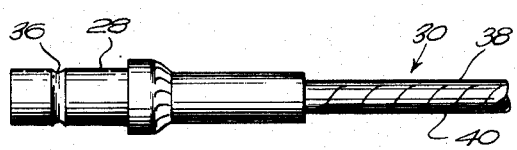
FIG. 3
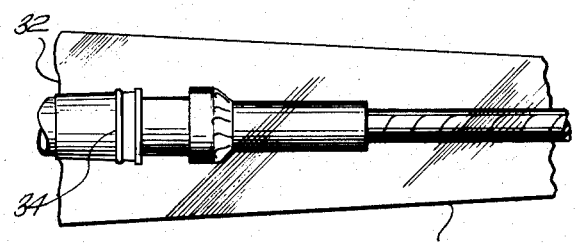
FIG. 4
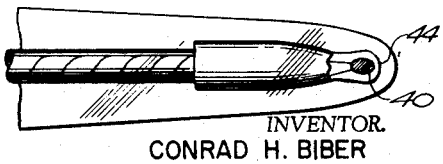
INVENTOR.
CONRAD H. BIBER
BY *Morse + Altman*
ATTORNEYS Dec. 7, 1965  C. H. BIBER  3,221,555
CLINICAL THERMOMETER Filed Nov. 1, 1961  2 Sheets-Sheet 2

INVENTOR.
CONRAD H. BIBER
BY
Morse & Altman
ATTORNEYS

United States Patent Office 3,221,555
Patented Dec. 7, 1965

3,221,555
CLINICAL THERMOMETER
Conrad H. Biber, 12 Taylor St., Needham, Mass.
Filed Nov. 1, 1961, Ser. No. 149,376
1 Claim. (Cl. 73—362)

This invention relates in general to clinical thermometers and more particularly concerns a new and improved direct reading electrical thermometer that is quick, convenient and accurate in operation and has particular utility where frequent measurements of body temperature must be made.

For many years, numerous temperature measuring instruments have been proposed in which temperature sensitive resistance elements have been used as arms of bridge circuits so that variations in resistivity occasioned by changes in temperature may be measured by a galvanometer connected between the two sides of the bridge. In some embodiments the temperature sensitive element is located at the end of a probe which is connected to the bridge by a rather long flexible lead. Devices of this sort are useful as clinical thermometers since they are generally quite accurate and more responsive than conventional mercury thermometers.

However, from certain aspects, present electrical clinical thermometers are objectionable. For example, the probes presently in use are rigid and relatively thick so as to cause discomfiture to the patient. Moreover, these devices have required a rather large number of components which make the complete instrument somewhat bulky and inconvenient to carry about and operate.

Accordingly, it is a general object of the present invention to provide an improved clinical thermometer of the type that employs a temperature-sensitive resistance element.

A more particular object of this invention is to provide a highly accurate electrical thermometer that is physically compact, utilizes a minimum number of components and yet is rugged and dependable.

Another object of this invention is to provide an improved bridge circuit for use in an electrical thermometer of the sort that employs temperature sensitive resistance elements.

Yet another object of this invention is to provide an improved probe for an electrical clinical thermometer.

A further object of the present invention is to provide disposable sleeves of improved design for use with the probe.

Still another object of the invention is to provide a novel package for storing and dispensing the disposable probe sleeves.

More particularly, this invention features an electrically operated clinical thermometer in which batteries supply power to a Wheatstone bridge circuit while simultaneously serving as arms of the bridge. As another feature of this invention, a temperature sensitive resistance element, forming a part of the bridge, is mounted in the tip of a detachable flexible probe. Others features include a novel arrangement for quickly and conveniently calibrating the instrument; disposable plastic sleeves which may be quickly slipped on and off the probe so as to eliminate the need of sterilizing the probe; and a packaging arrangement for the sleeves which permit packs of sleeves to be detached from the package without impaired the sterile condition of the remaining sleeve packs.

Figure 7:
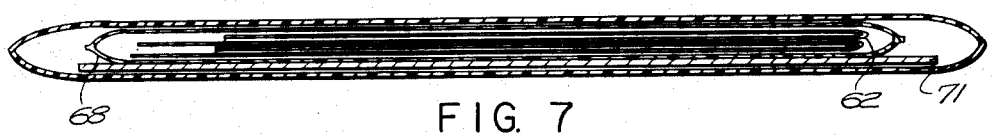
Figure 8:
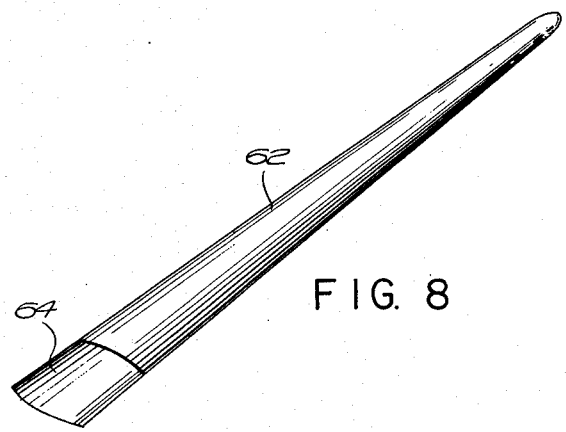

But these and other features of the invention, along with further objects and advantages thereof, will become more fully apparent from the following detailed description, taken in connection with the accompanying drawings in which;

FIG. 1 is a view in perspective of a battery powered clinical thermometer made according to the invention, FIG. 2 is a rear elevation of the thermometer with the back cover broken away to show the interior of the device, FIG. 3 is a detail view of a probe made according to the invention, FIG. 4 is a view similar to FIG. 3 but showing the probe connected to the lead and sheathed in a disposable sleeve, FIG. 5 is a diagram of the circuit used in the thermometer, FIG. 6 is an exploded view of a novel package containing a number of sleeve packs, FIG. 7 is a cross-sectional view taken along the line 7—7 of FIG. 6, and, FIG. 8 is a view in perspective of a disposable plastic sleeve for use with the probe.

In the drawing reference character 10 generally indicates a rectangular casing typically 4" long, 2¼" wide and 1½" high fabricated from hard rubber, molded plastic or other suitable material and having a front panel 12 and a rear cover portion 14. The front panel 12 is formed with an opening 16 covered by a transparent glass insert and behind which is mounted the dial of a galvanometer 18 graduated in degrees Fahrenheit from 95 to 105, for example. A button 20 is recessed into the front panel 12 and actuates a double pole switch 22 which will be described in greater detail in connection with the description of the circuit.

Extending out through the end of the casing 10 is an insulated flexible lead 24, of perhaps 3 feet in length, which terminates in a socket 26 adapted to accommodate the plug end 28 of a probe 30 having an overall length of about 2½". The socket 26 has a cylindrical configuration formed with a number of radial slits 32 and having a circumferential indentation which serves to seat a split ring 34 about the outer portion of the socket. The annular shoulder formed in the inner walls of the socket by the indentation is adapted to mate with a circumferential groove 36 formed in the plug end 28 to hold the probe in locking engagement with the socket when the two parts are pressed together axially. In practice these connections are made from a resilient metal which is gold plated for easy cleaning and to prevent tarnish.

The main body of the probe 30 consists of a coaxial cable 38 encapsulated within a jacket of silicone rubber 40 or other suitable material that is flexible and not affected by the high temperatures encountered by sterilization in an autoclave or boiling water. Fillets of epoxy material seal the jacket at both ends. Typical dimensions of the flexible portion of the probe include a length of about 1¾" and a diameter of about ⅛".

Bonded to the end of the probe is a thermistor element in the form of a bead 40 embedded in a glass tip 44. In a preferred embodiment of the invention, barium titanate is employed as the thermistor element although other materials may be used to advantage. Typically, a thermistor is a stable, compact and rugged two terminal, ceramic-like semiconductor element employed as a resistive circuit component and displaying a high negative temperature coefficient of resistance. The particular temperature coefficient is determined by the proportion of oxides in the element. The bead 42 is close to the surface of the glass tip and, having little mass, displays a short time constant. In any event, the resistance of the thermistor varies with temperature and is sensitive even to small changes in temperature. Preferred resistance characteristics for the thermistor would involve a resistance of about 2000Ω at room temperature changing to 1000Ω to 1500Ω within its expected operating range.

As will be readily understood, the probe 30 is inserted in a body orifice of the patient and the body temperature is read directly from the galvanometer dial by depressing the button 20.

Referring now more particularly to FIG. 5, the circuit for the instrument will be described in detail. Basically, the circuit represents an improvement on the well-known Wheatstone bridge. In this circuit, a pair of mercury batteries 46 and 48 each capable of producing 1.340 volts and, with normal use, having a useful life of about two years, is mounted in the casing by means of spring clips. Each battery forms an arm of the bridge and thereby eliminates the resistors normally employed. The double pole switch 22 is normally open and, as shown in FIG. 5 has a switching element in each of the two legs.

Of the remaining two legs of the bridge, the thermistor 42 constitutes one leg and a calibration potentiometer 50 together wtih a resolution resistor 52 make up the fourth leg. The resistance of the thermistor at room temperature exceeds that of the combined resistances of the potentiometer 50 and the resolution resistor 52 which preferably have resistance values of 500Ω and 1 K. respectively. Thus, when the thermistor is heated by contact with the patient, its resistance will be lowered and the bridge will be unbalanced. The galvanometer 18, connecting the two sides of the bridge and having an operating range of 0–75 microamperes, will respond to the unbalanced condition and deflect according to the current flow. The amount of deflection corresponds directly with the temperature and may be read directly from the temperature scale on the dial. A calibration potentiometer 54 is serially connected to the galvanometer 18 for precise adjustment of that component.

When the meter circuit is open, the galvanometer needle should rest at approximately 98.6° F. on the meter. A small adjusting screw 56 is provided below the dial to correct the needle position should it drift from its rest position. The circuit itself may be checked by detaching the probe 30 from the cord 24 and connecting the cord socket 26 to a post 58 mounted on the end of the casing 10. This arrangement removes the probe from the circuit and replaces it with a potentiometer 60 of 1500Ω. When the double pole switch 22 is closed, the needle indicator should come to rest at 102° F. on the dial.

In FIG. 8 there is illustrated a disposable plastic sleeve 62 about 5″ long for placement over the probe to prevent its direct contact with the patient. When taking the temperature of a number of patients within a short time, the same probe may be used without sterilization by merely changing the sleeve after it has been used. The sleeves preferably are made from two panels of an inexpensive, transparent plastic film such as polyethylene, 1 mil in thickness, and sealed along their marginal edges to form a tapered tube open at one end. One of the panels extends from the open end for a little more than ½″ to form a tab 64 which facilitates insertion of the probe into the sleeve. It will be appreciated that if the two panels were pressed flat against one another and of the same length, it would be somewhat of an annoying problem to separate the edges at the open end to permit entry of the probe.

In FIG. 6, there is illustrated a novel package for containing a quantity of disposable sleeves. The package comprises a rectangular transparent plastic envelope 66 having a pair of parallel ribs 68 and 70 formed along both sides of the envelope and about an inch or so from one end to define a scored tear line which will be weaker than the remaining portion of the envelope. By gripping the envelope with a hand on either side of the tear line and applying a shearing motion, the end piece (shown detached in FIG. 6) will rip away easily and neatly. The envelope may also be made from polyethylene although somewhat thicker than the sleeve material and typically about 5 mils. A cardboard stiffener 71 may also be provided to lend structural rigidity to the package.

Enclosed in the envelope are a number of transparent plastic packets 72 attached one to another along tear lines 74. Each packet 72 contains a quantity of disposable sleeves 62 which are sealed within the packet under sterile conditions.

It will now be understood that with the above described package, individual packets 72 can be detached for use without impairing the sterile condition of the remaining packets or their contents. Once detached, a packet is opened by tearing off the end portion along a tear line 76. One or two packets, each containing perhaps 10 disposable sleeves may be conveniently placed in a breast pocket or a similarly convenient location where they will be readily available for use. The cost of the sleeves is negligible and each is discarded after a single use.

While the invention has been described with particular reference to the illustrated embodiment, it will be understood that numerous modifications will appear to those skilled in the art without departing from the invention.

Having thus described my invention, what I claim and desire to obtain by Letters Patent of the United States is:

A temperature measuring device, comprising a bridge circuit having at least four arms, one of said arms including a thermistor element, the second of said arms including an adjustable resistance element, the third and fourth of said arms each including a battery and a manually operated switch, a temperature indicating current measuring meter connected diagonally across said bridge, said meter connecting said bridge at one end between said first and second arms and at the other end, between said third and fourth arms, an adjustable resistance element serially connected with said meter, both of said switches being normally open and connected for simultaneous operation, said meter being set to indicate a predetermined temperature lying within the normal operating range of said device when said switches are open and a variable resistance element adapted to be connected in said circuit in place of said thermistor element for calibrating said circuit, said variable resistance element being set to indicate on said meter a second predetermined temperature different from said first predetermined temperature but within the normal operating range of said device when said switches are closed.

References Cited by the Examiner

UNITED STATES PATENTS

| | | | |
|---|---|---|---|
| 2,098,650 | 11/1937 | Stein | 73—362 |
| 2,365,556 | 12/1944 | Karg | 206—63.2 |
| 2,612,780 | 10/1952 | De Bruyne | 73—362 |
| 2,736,784 | 2/1956 | Gore | 338—30 |
| 2,749,753 | 6/1956 | Adams | 73—362 |
| 2,818,482 | 12/1957 | Bennet | 338—30 |
| 2,864,713 | 12/1958 | Lewis | 338—352 |
| 2,910,174 | 10/1959 | Reid | 206—16.5 |
| 2,969,141 | 1/1961 | Katzin | 206—16.5 |
| 2,971,379 | 2/1961 | Weisheit | 73—362 |
| 3,017,990 | 1/1962 | Singerman | 206—63.2 |
| 3,082,625 | 3/1963 | Zimmerman | 73—362 |

FOREIGN PATENTS

| | | |
|---|---|---|
| 759,381 | 10/1956 | Great Britain. |

ISAAC LISANN, *Primary Examiner.*

L. R. PRINCE, *Examiner.*